US008640202B2

(12) United States Patent
Roy (10) Patent No.: US 8,640,202 B2
(45) Date of Patent: Jan. 28, 2014

(54) SYNCHRONIZING USER SESSIONS IN A SESSION ENVIRONMENT HAVING MULTIPLE WEB SERVICES

(75) Inventor: Patrick Roy, Gatineau (CA)

(73) Assignee: International Business Machines Corporation, Armonk, NY (US)

(*) Notice: Subject to any disclaimer, the term of this patent is extended or adjusted under 35 U.S.C. 154(b) by 968 days.

(21) Appl. No.: 11/867,348

(22) Filed: Oct. 4, 2007

(65) Prior Publication Data
US 2009/0094688 A1  Apr. 9, 2009

(51) Int. Cl.
*H04L 29/06* (2006.01)

(52) U.S. Cl.
USPC .................................. 726/4; 726/2

(58) Field of Classification Search
USPC ......................................... 726/2–21
See application file for complete search history.

(56) References Cited

U.S. PATENT DOCUMENTS

| 6,052,785 | A  | * | 4/2000  | Lin et al. ........................... 726/5 |
| 6,161,139 | A  | * | 12/2000 | Win et al. ......................... 709/225 |
| 6,490,624 | B1 | * | 12/2002 | Sampson et al. ................. 709/227 |
| 7,103,714 | B1 | * | 9/2006  | Jacobs et al. .................... 711/113 |
| 2,546,482 | A1 |   | 5/2007  | Satyavolu et al. |
| 7,530,099 | B2 | * | 5/2009  | Flurry et al. ...................... 726/8 |
| 7,610,806 | B2 |   | 11/2009 | Skinner |
| 2002/0169984 | A1 | * | 11/2002 | Kumar et al. .................. 713/201 |
| 2003/0163516 | A1 | * | 8/2003  | Perkins et al. ................. 709/203 |
| 2004/0010682 | A1 | * | 1/2004  | Foster et al. ................... 713/156 |
| 2004/0034686 | A1 | * | 2/2004  | Guthrie .......................... 709/203 |
| 2004/0128547 | A1 |   | 7/2004  | Laidlaw et al. |
| 2005/0021791 | A1 | * | 1/2005  | Sakiyama et al. ............ 709/229 |
| 2006/0294194 | A1 |   | 12/2006 | Graveline et al. |
| 2006/0294206 | A1 |   | 12/2006 | Graveline et al. |
| 2007/0022119 | A1 |   | 1/2007  | Roy et al. |
| 2007/0022210 | A1 |   | 1/2007  | Roy et al. |
| 2008/0256612 | A1 |   | 10/2008 | Roy et al. |

* cited by examiner

*Primary Examiner* — Edan Orgad
*Assistant Examiner* — Brian Olion
(74) *Attorney, Agent, or Firm* — Stephen R. Tkacs; Stephen J. Walder, Jr.; Yeen C. Tham (57) ABSTRACT

A mechanism is provided for synchronizing a first user session and a second user session in a client-server system. The first user session is between a first Web service and a client and the second user session is between a second Web service and the same client. A request is received with a first session value by the second Web service. An indicator of the first session value is assigned to a shadow, and the shadow is sent in a response to the client. A subsequent request with the shadow and a subsequent session value is received from the client. The indicator is used to verify the subsequent session value at the second Web service. The second user session is terminated if the indicator in the shadow does not correspond to the subsequent session value.

22 Claims, 6 Drawing Sheets

PRIOR ART

Figure 1

PRIOR ART

SYNCHRONIZING USER SESSIONS IN A SESSION ENVIRONMENT HAVING MULTIPLE WEB SERVICES

FIELD OF INVENTION

The present invention relates to Web service. More specifically, the present invention relates to synchronization of user sessions.

BACKGROUND OF THE INVENTION

The Internet is by far the largest, most extensive publicly available network of interconnected computer networks that transmit data by packet switching using a standardized Internet Protocol (IP) and many other protocols. The Internet has become an extremely popular source of virtually all kinds of information. Increasingly sophisticated computers, software, and networking technology have made Internet access relatively straightforward for end users. Applications such as electronic mail, online chat and Web browser allow the users to access and exchange information almost instantaneously.

The World Wide Web (WWW) is one of the most popular means used for retrieving information over the Internet. WWW can cope with many types of data which may be stored on computers, and is used with an Internet connection and a Web browser. The WWW is made up of millions of interconnected pages or documents which can be displayed on a computer or other interface. Each page may have connections to other pages which may be stored on any computer connected to the Internet. Uniform Resource Identifiers (URI) is an identifying system in WW, and typically consists of three parts: the transfer format (also known as the protocol type), the host name of the machine which holds the file (may also be referred to as the Web server name) and the path name to the file. The transfer format for standard Web pages is Hypertext Transfer Protocol (HTTP). Hyper Text Markup Language (HTML) is a method of encoding the information so it can be displayed on a variety of devices.

HTTP is the underlying transactional protocol for transferring files (text, graphic images, sound, video, and other multimedia files) between clients and servers. HTTP defines how messages are formatted and transmitted, and what actions Web servers and browsers should take in response to various commands. A Web browser as an HTTP client typically initiates a request by establishing a TCP/IP connection to a particular port on a remote host. An HTTP server monitoring that port waits for the client to send a request string. Upon receiving the request string (and message, if any), the server may complete the protocol by sending back a response string, and a message of its own, in the form of the requested file, an error message, or any other information. Web pages regularly reference to pages on other servers, whose selection will elicit additional transfer requests. When the browser user enters file requests by either "opening" a Web file by typing in a Uniform Resource Locator (URL), or clicking on a hypertext link, the browser builds an HTTP request. In actual applications, when a plurality of clients connect to a cluster of servers, clients may need to be distinguished and authenticated, the servers need to maintain session state, and the clients need to be directed to the same server for the duration of the session. Otherwise, the client may reconnect to a different server than the one it started the session with. The servers may use a state management mechanism based on session token.

The identity of the user is authenticated through the presentment and validation of a set of credentials at the start of a token based session, for example the validation of an ID and password, the validation of any other type of information that derives from information that the user knows, or the validation of various characteristics, such as biometric credentials. After authentication, the identity of the user is established and this identity may be used by the underlying Web application to ensure that the user is handled in an appropriate way. Typically, this includes ensuring that the user has been given authorization to perform requested privileged activities. This identity may also be used to ensure correct association with other information related to identity, such as valid financial instruments. Authentication results in the return of an authentication token from the authenticating server to the client. The authentication token may be in a session cookie when implemented in HTTP protocol.

The authentication token is presented with each subsequent request from the client. When a client sends a message, the client sends the authentication token, along with the message, to signify the authenticated identity of the client. The authentication token is provided in lieu of authentication credentials because the receiving system may recognize the authentication token and use the authentication token to retrieve information about the previously authenticated client. The session cookie with the authentication token may also be used by the server to compare information about the current session with previously stored information. Session information may include information about the original credentials presented plus session attributes such as duration, originating system or network, and more. Secure session management therefore involves a system where the client submits the session cookie with each request, and the receiving system validates the cookie with each request.

By a request from the client, the secured session may be terminated. Upon termination of a session, if the client system subsequently attempts to present the authentication token that corresponds to the terminated session, an error will occur and the target of the request will reject the request.

However, nowadays it is quite possible for a user at a client site to establish simultaneously a plurality of sessions to a plurality of servers during one log-on. Furthermore, the client may establish an authentication session with an authentication server, and receive one or more authentication for one or more server in other independent sessions.

The user may not be aware of the additional sessions, or forget to terminate one of the sessions. In this scenario, one of the secured sessions is still unknowingly maintained, thus compromise the security of the client-server system. The prior art method and system failed to address this shortcoming.

US patent application 20040128547 for example describes a system a modular authentication means with an authentication server module made available for various remote applications for use to facilitate authentication of users. An authentication client interfaces with an authentication server module to transmit the authentication information. When a client receives a request to perform a task from a user, the client forwards the request to a module that is configured to authenticate the user. The authentication module verifies the identity of the user. The authentication module may supply a session cookie indicative of the verification. Thereafter, the pre-determined permissions of the user are determined. After it is determined that the user has permission to perform the requested task, the requested task is then performed. The permissions may be stored in an access control list that contains data regarding the identity and privileges of the user.

U.S. Pat. No. 7,225,464 attempts to identify a user session with the help of a federated convention known as domain name service (DNS). The DNS provides a look-up service for IP addresses on a network for navigating purposes. The service finds an IP address for a querying machine. IP addresses are both allocated and assigned depending on the type of use and class of the address. A client machine that is transient will retain the same IP address only while it is logged on to the Internet during a single network session. Therefore the DNS system can identify a specific machine during a multi-site browsing session. It is envisioned that the host of a password protected or otherwise secure Web site or Web function could identify a user remotely by knowing the user ID at a level that is more granular than the IP address and could validate the state of a session from a reliable source. A session cookie after a first successful authentication by the user at a Web site during a network session, the token cached at a server and at the user's machine or proxy machine and wherein upon navigation by the user to a next Web site or form requiring secure authentication, the token is used to identify the user and a remote call is used to validate the user session instead of requiring manual authentication procedures.

These prior art systems and methods do not address the possible security risks for failure to terminate one of the sessions.

Accordingly, systems and methods are therefore needed in order to overcome these and other limitations of the prior art.

There is further a need to synchronize the session between a client and a plurality of servers in a plurality of sessions.

SUMMARY OF THE INVENTION

It is an object of the invention to provide an improved system and method for synchronizing user sessions.

According to one aspect of the present invention there is provided a method of synchronizing two user sessions. The first user session is between a first Web service and a client and the second user session is between a second Web service and the same client. A request is received with a first session value by the second Web service. An indicator of the first session value is assigned to a shadow, and the shadow is sent in a response to the client. A subsequent request with the shadow and a subsequent session value is received from the client. The indicator is used to verify the subsequent session value at the second Web service. The second user session is terminated if the indicator in the shadow does not correspond to the subsequent session value.

Preferably, the second Web service is a Web application.
Preferably, the first Web service is an authentication tool.
Preferably, the authentication tool is on a Web server.
Preferably, the method has an additional step such as: initiating a new user session, creating a new user session based on the subsequent session value between the client and the second Web service, or prompting a user for credentials, or discarding the subsequent request.

Preferably, the indicator is verified by a component of the second Web service.

Preferably, the component of the Web service is an application firewall.

Preferably, the shadow is a cookie set to the first session value by the second Web service.

Preferably, the second user session is terminated if the subsequent session value is absent.

Preferably, a retrieval mechanism of the first session value used by the second Web service is configurable.

Preferably, the first session value is obtained from an HTTP header having an HTTP header name.

Preferably, the HTTP header name is configured to "REMOTE_USER".

Preferably, the second session value is a cookie which is discarded from the subsequent request by the second Web service, and in requests after the subsequent request using a cookie deletion notice sent to the client.

Preferably, the shadow is digitally signed with member selected from a group consisting of a user session element, a server secret and a combination thereof.

Preferably, the indicator is a hash of the first session value.

According to another aspect of the present invention there is provided a system of synchronizing a first user session between a first Web service and a client with a second user session between a second Web service and the client, the system comprising: a client sending a request with a first session value; a server hosting the second Web service receiving the request with the first session value; the server assigning an indicator of the first session value to a shadow; the server sending the shadow in a response to the client; receiving a subsequent request having the shadow, and a subsequent session value from the client; the server verifying the subsequent session value at the second Web service using the indicator; and terminating the second user session if the indicator in the shadow does not correspond to the subsequent session value.

According to another aspect of the present invention there is provided a storage medium readable by a computer encoding a computer program for execution by the computer to carry out a method of synchronizing a first user session between a first Web service and a client with a second user session between a second Web service and the client, the computer program comprising: code means for receiving a request with a first session value by the second Web service; code means for assigning an indicator of the first session value to a shadow; code means for sending the shadow in a response to the client; d) code means for receiving a subsequent request having the shadow, and a subsequent session value from the client; e) code means for verifying the subsequent session value at the second Web service using the indicator; and f) code means for terminating the second user session if the indicator in the shadow does not correspond to the subsequent session value.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 3 (a) illustrates a user session between a client and a Web service;

FIG. 3 (b) illustrates an example of a Web service delivering authentication service;

FIGS. 5 (a), (b) and (c) show examples of synchronizing user sessions in accordance with one embodiment of the present invention.

DETAILED DESCRIPTION OF A PREFERRED EMBODIMENT

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The term "client" is intended to describe a process with one or more resident facilities, such as a browser. The browser, for example, may access the Internet, navigate to one or more addressable servers, request access to a server processor, and negotiate an information exchange.

The term "server" is intended to describe an Internet-addressable logical facility having one or more structured information assets for dissemination, update, or exchange in the event that an accessing client satisfies one or more logical and security conditions. The data accessing and exchange is executed at an applications execution level at both client and server. The interaction between clients and servers occurs exclusively by messages.

The term "cookie" is intended to describe a text-based file generated by a Web server and stored on a client's computer for later retrieval when, for example, the client enters a Web site. A cookie generally facilitates client navigation within a Web site and enables Web sites to gather information about users entering the site.

The term "session" is intended to describe a physical and time connection between a client and a server of variable duration and comprise several stages or transactions.

When two or more sessions are using cookies in the same domain the sessions may be considered as in same session environment.

The term "Web service" is intended to describe an implementation of a logic delivering a service to a network client. The network protocol may be HTTP. The client may be a browser. SOAP Web service is one example of the plurality of available Web services.

Figure 1:
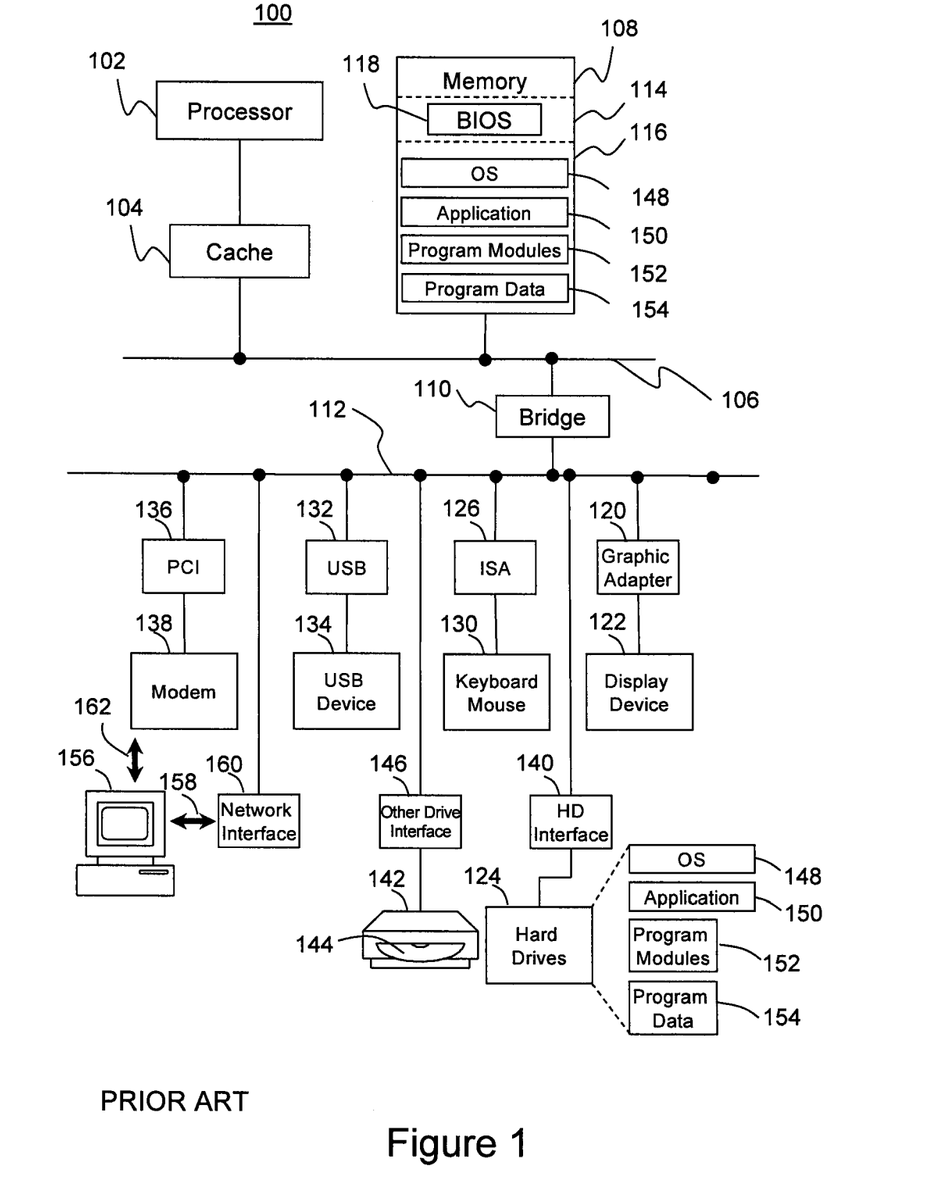
FIG. 1 shows a generic computing environment in which the present invention may be implemented.

FIG. 1 and the following discussion are intended to provide a brief general description. FIG. 1 illustrates a block diagram of a suitable computing environment in which a preferred embodiment of the present invention may be implemented.

Those skilled in the art will appreciate that the invention may be practiced with many computer system configurations, including personal computers, hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Although not required, the invention will be described in the general context of computer-executable instructions, such as program modules, being executed by a personal computer. Generally, program modules include routines, programs, objects, components, data structures and the like that perform particular tasks or implement particular abstract data types.

With reference to FIG. 1 an exemplary system 100 for implementing the invention may be, for example, one of the general purpose computers. The system 100 includes processor 102, which in the exemplary embodiment are each connected to cache memory 104, the cache 104 is connected in turn to a system bus 106 that couples various system components.

Also connected to system bus 106 are a system memory 108 and a host bridge 110. Host bridge 110 connects I/O bus 112 to system bus 106, relaying and/or transforming data transactions from one bus to the other. The system bus 106 and the I/O bus 112 may be any of several types of bus structures including a memory bus or memory controller, a peripheral bus, and a local bus using any of a variety of bus architectures. The system memory includes read-only memory (ROM) 114 and random access memory (RAM) 116. A basic input/output system 118 (BIOS), containing the basic routines that help to transfer information between elements within the personal computer 100, such as during start-up, is stored in ROM 114.

In the exemplary embodiment, the system 100 may further include a graphics adapter 120 connected to I/O bus 112, receiving user interface information for display device 122. A user may enter commands and information into the system 100 through input devices 130 such as a conventional mouse, a key board 130, or the like. Other input devices 134 may include a microphone, joystick, game pad, satellite dish, scanner or the like. The devices may be connected via an Industry Standard Architecture (ISA) bridge 126, or a Universal Serial Bus (USB) bridge 132 to I/O bus 112, respectively. PCI device such as a modem 138 may be connected to the I/O bus 112 via PCI bridge 136.

The exemplary system 100 may further include a hard disk drive 124 for reading from and writing to a hard disk, connected to the I/O bus via a hard disk interface 140, and an optical disk drive 142 for reading from or writing to a removable optical disk 144 such as a CD-ROM or other optical media. The hard disk drive 124, magnetic disk drive 28, and optical disk drive 142 may be connected to the I/O bus 112 by a hard disk drive interface 140, and an optical drive interface 146, respectively. The drives and their associated computer-readable media provide non-volatile storage of computer readable instructions, data structures, program modules and other data for the system 100. Although the exemplary environment described herein employs a hard disk 124 and a removable optical disk 144, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk 124, optical disk 144, ROM 118 or RAM 116, including an operating system 148, one or more application programs 150, other program modules 152 and program data 154.

The exemplary system 100 may operate in a networked environment using logical connections to one or more remote computers, such as a remote computer 156. The remote computer 156 may be another personal computer, a server, a router, a network PC, a peer device or other common network node, and typically includes many or all of the elements described above relative to the exemplary system 100. The logical connections depicted in FIG. 1 include a network 158, for example, a local area network (LAN) or a wide area network (WAN). Such networking environments are commonplace in offices, enterprise-wide computer networks, Intranets and the Internet.

When used in a networking environment, the exemplary system 100 is connected to the local network 158 through a network interface or adapter 160. The exemplary system 100 may use the modem 138 or other means for establishing communications 162 over a wide area network such as the Internet. In a networked environment, program modules depicted relative to the exemplary system 100, or portions thereof, may be stored in the remote memory storage device. It will be appreciated that the network connections shown are exemplary and other means of establishing a communications link between the computers may be used.

The exemplary embodiment shown in FIG. 1 is provided solely for the purposes of explaining the invention and those skilled in the art will recognize that numerous variations are possible, both in form and function. For instance, the exemplary system 100 may also include a magnetic disc drive, and numerous other optional components. All such variations are believed to be within the spirit and scope of the present invention. The exemplary system 100 and the exemplary figures below are provided solely as examples for the purposes of explanation and are not intended to imply architectural limitations. In fact, this method and system can be easily adapted for use on any programmable computer system, or network of systems, on which software applications can be executed.

Figure 2:
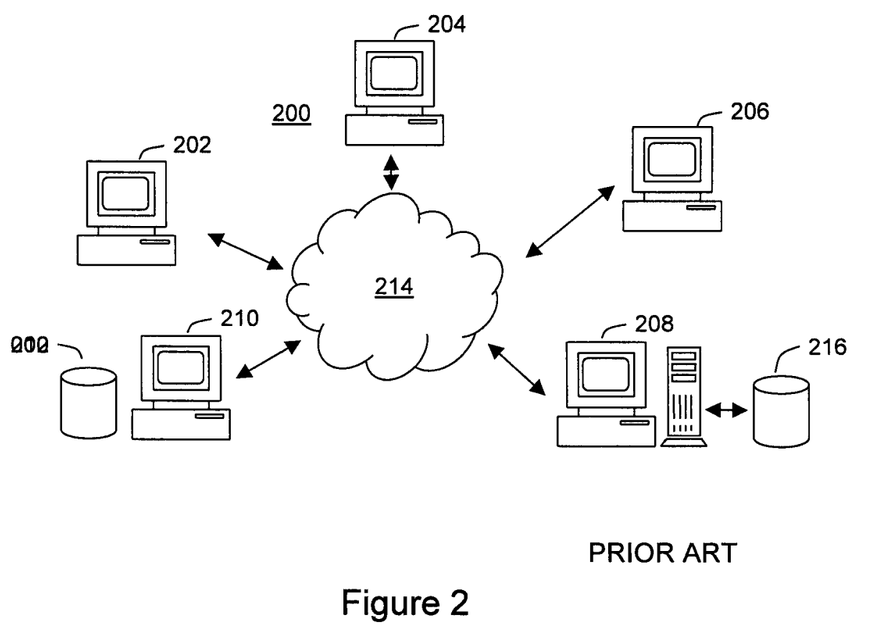
FIG. 2 shows a generic overview of a network environment.

FIG. 2 illustrates an exemplary network 200 environment in which the present invention may be wholly or partially employed. It should be apparent to a person skilled in the art that actual network and database environments can be arranged in a variety of configurations; however, the exemplary environment shown here provides a framework for understanding the type of environment in which the present invention operates. The network 200 may include client computers 202, 204, 206, a server computer 208, data source computers 210, and database 212. The client computers 202, 204, 206 and the data source computers 210 are in communication with the server computer 208 via communications network 214, which is a medium that may be used to provide communications links between various computers. The communications network 214 may be a LAN, WAN, Intranet, Internet, or the like. The communications network 214 may include permanent connections, such as wire or fiber optic cables, or wireless connections. Client computers 202, 204, 206 and data source computers 210 are connected to the communications network. Client computers 202, 204, 206, data source computers 210 and server computer 208 may be represented by a variety of computing devices, such as mainframes, personal computers, personal digital assistants (PDAs), etc.

Server computer 208 provides management of database 212 by way of database server system software. In FIG. 2, data sources are provided by data source computers 210. Data source computer 210 communicates data to server computer 208 via communications network 214. Data source computers 210 store data locally in databases 212, which may be relational databases, multidimensional databases, files, or the like.

Client computers 202, 204, 206 that desire to use the data stored by server computer 208 can access the database 216 via communications network 214. Client computers 202, 204, 206 may request the data by way of SQL queries on the data stored in database 216.

In the depicted example, distributed data processing system 200 may include the Internet with network 214 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), HTTP, Wireless Application Protocol (WAP), etc. Of course, network 200 may also include a number of different types of networks, such as, for example, an intranet, a local area network (LAN), or a wide area network (WAN). The transfer format for standard Web pages is HTTP.

Figure 3:
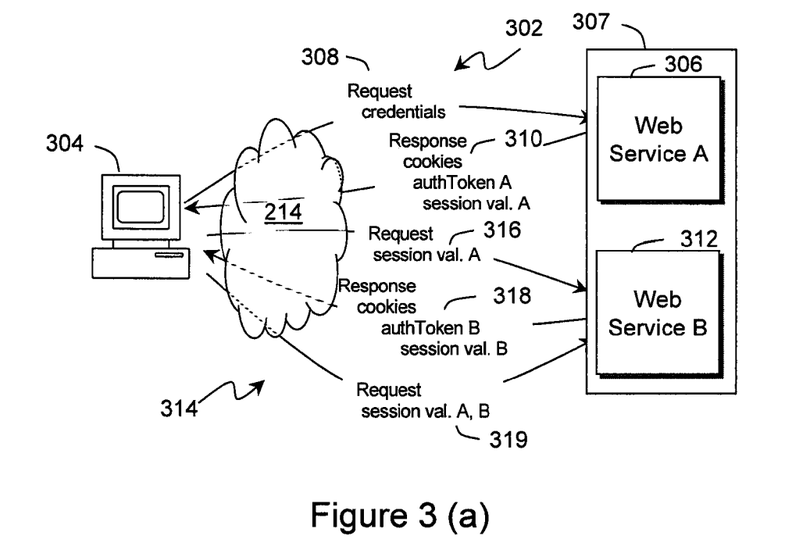

FIG. 3 (*a*) illustrates a user session 302 between a client 304 and a Web service A 306 in a session environment 307, the session environment 307 includes Web service A 306 and Web service B 312, using HTTP as the underlying transactional protocol between the client 304 and the Web service A 306. As HTTP is inherently stateless, it does not automatically afford a mechanism for session management. When a user sends a request from a client 304, for example from a Web browser, there is no standard method for the receiving HTTP server to recognize the user identity or the fact that earlier requests originated from the same client.

In order to overcome this deficiency, Web service A 306 may use a cookie to identify a user on the client 304. Referring to FIG. 3 (*a*), after a request 308 is sent from the client 304 to the Web service A 306, a session cookie may be included in a response 310 to the client 304. The session cookie is typically a named piece of data that the Web service A 306 sends to the client 304 and includes an authentication token, the client 304 stores and sends the session cookie back to the Web service A 306 each time the client 304 transmits a request 316 to the Web service A 306 inside the session environment 307, assuming the user employs a client Web browser with cookie support present and enabled. A Web service A 306 may inspect the value of the session cookie, and determine that a given Web request is from a user who had previously been sent a session cookie based on the validity of the cookie value, namely the authentication token.

A session cookie generally includes a session cookie name and a session cookie value in the form of a name-value pair. The name is used to identify the cookie and the value may include an authentication token. For example, a client might receive a session cookie on the client's browser in the form of a name-value pair as follows:

clientID A9A3BECE0563982D

In this example, "clientID" is the session cookie name and "A9A3BECE0563982D" is the session cookie value, which may be an authentication token.

Most cookies are also time-sensitive, meaning the cookie is often associated with an expiration date, after which the client no longer sends the cookie to the associated server and the client computer removes the cookie from its internal database. Generally, the cookies may be divided into two groups, namely "session-only" cookie which expire automatically when the browser shuts down, and a "persistent" cookie which generally expires at a date and time set by the server. In addition, Web services receiving same session values in session cookies are considered to be in the same domain, or same session environment. In other words, Web services within a session environment receives all session values for the sessions in that session environment.

In the following description, the term "session cookie" is intended to include the information being exchanged between a Web client and a Web service, a Web application or a Web server. In general, this information is used to maintain the user session between the client and the application.

The Web service A 306 may also use session cookie to establish secure sessions. In an authenticated session, a client 304 visiting a Web site for the first time is typically queried for credentials. After the client 304 provides the requested credentials in a request 308, the information is then processed against a database associated with the Web service A 306 for authentication. Upon valid authentication, an authentication token is then typically issued to the client 304 in a response 310. Issuing an authentication token usually occurs by sending to the client's browser a cookie with the authentication token information contained therein. A copy of this cookie information is then sent back, for example, as an HTTP cookie, to the Web service A 306 that issued the cookie upon each new request, in request 308 made by the client 304 within that particular session environment 307. During the secure session, the cookie is generally configured to expire when the client 304 terminates the browser session, either by logging out of the Web site or by closing out the browser. A session cookie value may be a unique identifier, usually in the form of a random number that is sent from the Web service A 306 to the client 304 to identify the current interaction session.

A user at the client 304 may be logged onto more than one Web service within the session environment 307 simultaneously, as exemplified by Web service A 306, Web service B 312. In this example, two sessions 302 and 314 are present. Each Web service within a session environment receives all session values for the sessions in that session environment, for example in the session environment for the same cookie domain.

After a session request 308 is sent to the Web service A 306, a session cookie 310 containing an authentication token with session value A is sent back to the client 304, thereby establishing a first user session 302 between one Web service, for example, Web service A 306 inside the session environment 307 and the client 304. The session cookie 310 includes a name-value pair, the session value A may refer to the user who sends the request 308 at the client 304. The second session 314 is established when the client 304 sends a request 316 with the session value A to a second Web service, for example, Web service B 312 inside the session environment 307. The request 316 includes a token with session name and session value and credentials for session B, sent to client 304 in the first session 302. Credentials for session B are checked independently. A response 318 with a cookie containing authentication token B with the session value B is sent back to the client 304, the second session 314 is established between the Web service B 312 and the client 304. In subsequent requests 319, the session values A and B are included, to request the Web services A and B within the same session environment 307.

FIG. 3 (b) illustrates an example of a Web service delivering authentication service residing on a Web server 326 which is separated from the Web service 328. The authentication service may be, for example, an authentication tool 324. In this example, the Web server 326 and the Web application C 328 can be considered as part of the session environment 327. The client 304 provides the requested information, for example, credentials. The information is then used by the authentication tool 324 for authentication. Upon valid authentication, an authentication token A is included in a response 330 and sent to the client 304. The second session 322 is started when the client 304 sends a request 334 with the authentication session value A to a second Web service, for example, Web application C 328 inside the session environment 327. The request 334 with the authentication session value A 330 reaches the Web application C 328, based on a trust relationship between authentication tool 324 and the Web application C 328. The request 334 includes the session value A, sent to client 304 in the first session 308. A response 336 with a cookie containing authentication token C with the session value C is sent back to the client 304, the second session 322 is established between the Web application C 328 and the client 304. In subsequent requests 337, the session values A and C are included. The second session 322 is an application session in this example.

The request 308 is updated, for example, by adding the user name to the header of the request, and sent from the Web server 325 to the Web application 328. One possible HTTP header name to include the user name is the REMOTE_USER. The updated request 332 is then sent to the Web service 328.

Following is an example of the "REMOTE_USER" header added by the Web server 326 to the request 308
GET /path/cgi-bin/app.cgi HTTP/1.1
Content-Type: application/x-www-form-urlencoded
User-Agent: Mozilla/4.0 (compatible; MSIE 7.0; Windows NT 5.1; NET CLR 1.1.4322; .NET CLR 2.0.50727)
Proxy-Connection: Keep-Alive
Host: ws2
Pragma: no-cache
Cookie: authtoken=439c6add-3bbc-11 dc;
REMOTE_USER: bob The Web service B 312 may obtain the user name of the Web service A 306, for example an authentication service, from the HTTP header value.

When the first session, for example, the authenticated user session 302 is terminated, the second session, for example, the application session 322 may not terminate at the same time. This may be caused by different reasons. For example, the user may inadvertently logged off the authenticated user session 302; the first session 302 may be timed out without a clear indication that the second session 322 is still being maintained; or that the session 316 was initiated transparently from the user by the authenticating Web service A 306, for example, through an auto log-in process.

Figure 4:
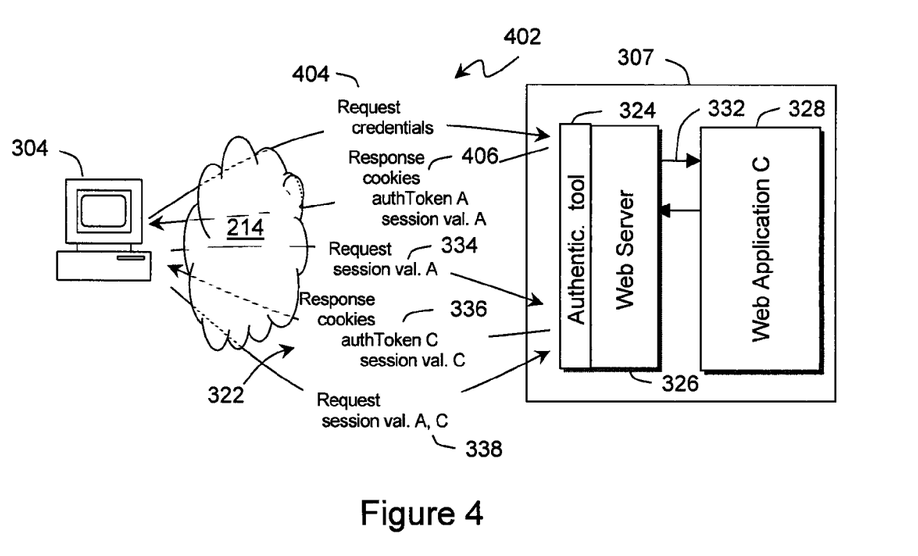
FIG. 4 depicts an example where a user bypasses an authentication tool.

As shown in FIG. 4, a second user established a new session 402 with the Web server 326, after providing proper credentials in a request 404, and receiving a response 406 including an authentication token with a session value A. The second user does not have the permission to access the Web application C 328. However, since the application session 322 is not terminated, the second user still has the session cookie 336 from the first user, and is capable of accessing the Web application C 328 by sending request 338.

The second user may therefore be authenticated at the Web server 326, for example, for a Web service the user has permission to access. However, the existing session 322 provides improper permission to the second user to access the Web service 328. The second user at the client 304 may receive unintended privilege in the Web application C 328.

In general, if a first user is logged onto a first Web service inside a session environment, for example, onto an authentication tool, and establishes a first session with the first Web service. Subsequently, the first user establishes a second session with a second Web service inside the session environment while the first session is active. When the first session is terminated, the second session may still be present. If the client browser remains open, a second user may log on to the first Web service using his own credential, and utilize the existing session cookie to access Web service corresponding the privilege of the first user.

Figure 5:
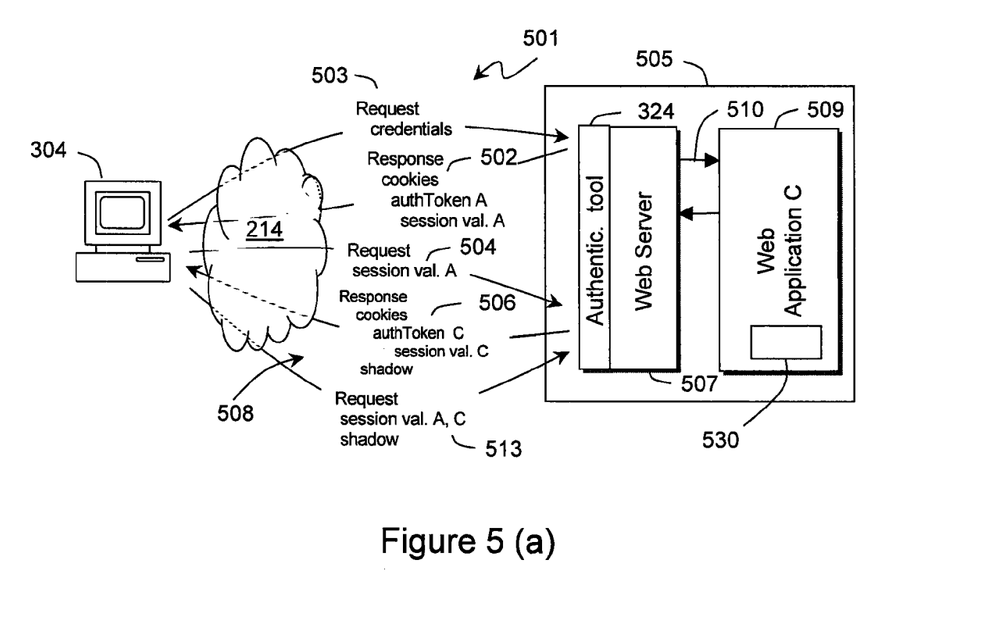

Referring to FIG. 5 (a), in accordance with one embodiment of the present invention, a request 503 is first sent to a session environment 505, for example to an authentication tool 324 on a Web server 507 inside the session environment 505. As described in the above, a response 502 including the session cookie with a session value A. The session value A may be in the form of a name-value pair. The second session 508 is established when the client 304 sends a request 504 to a second Web service, for example, Web service 509 inside the session environment 505. The request 504 includes a session value sent to the client 304 in the first session 501. Alternatively, an authentication 510 may be sent from a first Web service to a second Web service, for example, from the Web server 507 to the Web service 509.

The second Web service 509 inside the session environment 505 then includes a shadow in addition to the session cookie 506 sent to the client 304. The shadow is indicative of the first session 501 and may include the value of the first session cookie in the first session 501. In other words, an indicator to the first session value is included in the shadow. In subsequent requests 511, the shadow, or a copy thereof, the session value for the second session and the session value for the subsequent session are included 513.

The session value for the subsequent session is verified with the shadow which is indicative of the first session. If the session value for the subsequent session is not valid, the second session is reset or terminated. This reset or termination may also result from the absence of the session value for the subsequent session. The subsequent request may be discarded. A new session may then be initiated. A new user session based on the session value for the subsequent session may be created. It is also possible that the user at the client is prompted again for user credentials.

Figure 6:
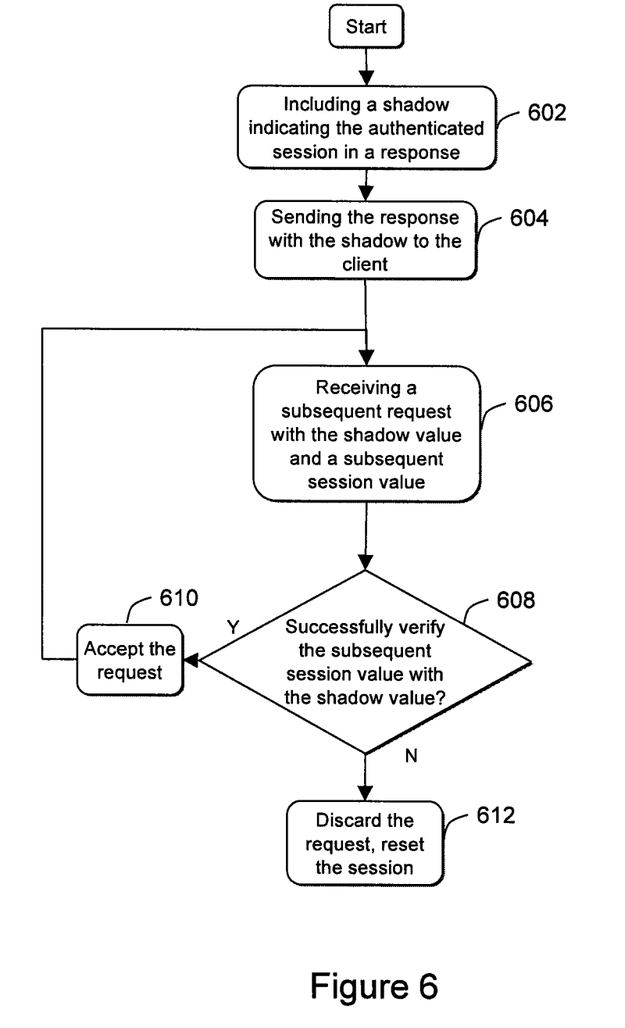
FIG. 6 depicts the steps of authenticating a request from a client in accordance with one embodiment of the present invention.

FIG. 6 shows the steps of authenticating a request from a client 304 in accordance with one embodiment of the present invention. A shadow indicating the authenticated user is included 602 in a shadow value. The shadow value may accompany the session cookie 502 being sent 604 to the client 304. After receiving subsequent requests 504 at step 606 from the client 304, the subsequent session value is verified 608 to see whether it is valid. If the subsequent session value is valid, the request will be accepted 610, an application session cookie 506 is sent to the client 304 and the application session 508 is established. Otherwise the request will be discarded 612 and the session reset.

In one of the embodiments, the authentication token of the first session may change over time, for example, through a "roll over" algorithm. However, the updated request 510 from the Web server 326 to Web service 328 may utilized the value received through the trust relationship, for example, the HTTP header value, which remains unchanged. This allows the shadow indicator to be valid even if a roll over occurs, which remain unchanged for a given user.

In one of the embodiments, the name of the HTTP header or any other HTML element used to pass the user session from the first Web service to the second, for example, the REMOTE_USER is configurable.

FIG. 5 (b) shows another embodiment of the present invention. In this example, the session value A is unique with regard to the first user, and is static for the duration of the application session 514. A shadow indicative of the session value A is included in the response 518. The shadow is included in the subsequent requests 519. The Web service B 522 is able to verify the subsequent session value using the shadow without a trust relationship between the Web service A 520 and Web service B 522, because the session value A is unique and static for the duration of the session 514.

FIG. 5 (c) shows another exemplary embodiment. In this example, the Web service A 524 provides an API 526 to the Web service B 528. The Web service B 528 can obtain the user identifier by calling the API based on the authentication token.

Referring to FIG. 5 (a) (b) and (c), the comparison of indicator of the shadow with the authenticated session value may take place at the Web service A 306, at the authentication tool 324 on the Web server 326, or at a component 530 of the Web service 328. The component 530 of the Web service 328 may be an application firewall. Application firewall in relation to the Web application has been described in published US patent application 20060294206, filed Jul. 22, 2005, entitled "Opaque cryptographic Web service data protection"; in published US patent application 20070022210, filed Jul. 21, 2005: entitled "Web application response cloaking"; in published US patent application 20060294194, filed Jun. 23, 2005, entitled "Access control list checking"; and in published US patent application 20070022119, filed Jul. 22, 2005, entitled "Rich Web application input validation"; the contents of all the published applications are herewith incorporated by reference in their entireties.

The shadow may accompany a session cookie being sent from a Web service to the client 304. The shadow value may be the user identifier of the first session 501. The shadow value may be signed using one or more of the digitally signing methods described in U.S. application Ser. No. 11/787,268, filed on Apr. 13, 2007, titled "Method and System for Stateless Validation", the content of which is incorporated by reference in its entirety.

The shadow value may be a hash of a session value. The hash of a value in a client server system has been described in published US patent application 20060294206, filed Jul. 22, 2005, entitled "Opaque cryptographic Web application data protection", the content of which is incorporated by reference in its entirety.

Embodiments within the scope of the present invention can be implemented in digital electronic circuitry, or in computer hardware, firmware, software, or in combinations thereof. Apparatus within the scope of the present invention can be implemented in a computer program product tangibly embodied in a machine-readable storage device for execution by a programmable processor; and method actions within the scope of the present invention can be performed by a programmable processor executing a program of instructions to perform functions of the invention by operating on input data and generating output. Embodiments within the scope of the present invention be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present invention include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits). While particular embodiments of the present invention have been shown and described, changes and modifications may be made to such embodiments without departing from the true scope of the invention.

The present invention has been described with regard to one or more embodiments. However, it will be apparent to persons skilled in the art that a number of variations and modifications can be made without departing from the scope of the invention as defined in the claims.

What is claimed is:

1. A method comprising:
in response to receiving, by a second Web service, a request to access the second Web service, the request having a first session value corresponding to a first user session between a first Web service and a client, assigning an indicator representing the first session value;
sending a second session value and the indicator in a response from the second Web service to the client, wherein the second session value corresponds to a second user session between the second Web service and the client; and
in response to receiving, by the second Web service, a subsequent request to access the second Web service, the subsequent request having the second session value and a current user session value corresponding to a current user session between the first Web service and the client, terminating, by the second Web service, the second user session if the current user session value received in the subsequent request does not correspond to the indicator.

2. The method as claimed in claim 1, wherein the second Web service is a Web application.

3. The method as claimed in claim 1, wherein the first Web service is a authentication tool.

4. The method as claimed in claim 3, wherein the authentication tool is on a Web server.

5. The method as claimed in claim 1, further comprising a step selected from the group consisting of initiating a new user session, creating a new user session based on the current session value between the client and the second Web service, and prompting a user for credentials.

6. The method as claimed in claim 1, further comprising discarding the subsequent request.

7. The method as claimed in claim 1, wherein the terminating the second user session is performed by a component of the second Web service.

8. The method as claimed in claim 7, wherein the component of the second Web service is an application firewall.

9. The method as claimed in claim 1, wherein the indicator is assigned to a cookie in the second Web service.

10. The method as claimed in claim 1, wherein the second user session is terminated if the current session value is absent.

11. The method as claimed in claim 1, wherein a retrieval mechanism of the first session value used by the second Web service is configurable.

12. The method as claimed in claim 11, wherein the first session value is obtained from an HTTP header having an HTTP header name.

13. The method as claimed in claim 12, wherein the HTTP header name is configured to "REMOTE_USER".

14. The method as claimed in claim 1, wherein the second session value is stored in a cookie which is discarded from the subsequent request by the second Web service, and in requests after the subsequent request using a cookie deletion notice sent to the client.

15. The method as claimed in claim 9, wherein the cookie is digitally signed with member selected from a group consisting of a user session element, a server secret and a combination thereof.

16. The method as claimed in claim 1, wherein the indicator is a hash of the first session value.

17. A system comprising:
a processor; and
a memory coupled to the processor, wherein the memory comprises instructions which, when executed by the processor, cause the processor to:
in response to receiving, by a second Web service, a request to access the second Web service, the request having a first session value corresponding to a first user session between a first Web service and a client, assign an indicator representing the first session value;
send a second session value and the indicator in a response from the second Web service to the client, wherein the second session value corresponds to a second user session between the second Web service and the client; and
in response to receiving, by the second Web service, a subsequent request to access the second Web service, the subsequent request having the second session value and a current user session value corresponding to a current user session between the first Web service and the client, terminate, by the second Web service, the second user session if the current user session value received in the subsequent request does not correspond to the indicator.

18. The system as claimed in claim 17, wherein the second Web service is a Web application.

19. The system as claimed in claim 17, wherein the first Web service is an authentication tool.

20. A non-transitory storage medium readable by a computer encoding a computer program for execution by the computer, wherein the computer program, when executed by the computer, causes the computer to:
in response to receiving, by a second Web service, a request to access the second Web service, the request having a first session value corresponding to a first user session between a first Web service and a client, assign an indicator representing the first session value;
a second session value and the indicator in a response from the second Web service to the client, wherein the second session value corresponds to a second user session between the second Web service and the client; and
in response to receiving, by the second Web services, a subsequent request to access the second Web service, the subsequent request having the second session value and a current user session value corresponding to a current user session between the first Web service and the client, terminate, by the second Web service, the second user session if the current user value received in the subsequent request does not correspond to the indicator.

21. The storage medium as claimed in claim 20, wherein the second Web service is a Web application.

22. The storage medium as claimed in claim 20, wherein the first Web service is an authentication tool.

* * * * *